United States Patent
Levien et al.

(10) Patent No.: US 9,690,457 B2
(45) Date of Patent: Jun. 27, 2017

(54) VIRTUAL REALITY APPLICATIONS

(75) Inventors: Roy Levien, Lexington, ME (US); Mark Malamud, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 309 days.

(21) Appl. No.: 13/821,560

(22) PCT Filed: Aug. 24, 2012

(86) PCT No.: PCT/US2012/052320
§ 371 (c)(1), (2), (4) Date: Mar. 7, 2013

(87) PCT Pub. No.: WO2014/031126
PCT Pub. Date: Feb. 27, 2014

(65) Prior Publication Data
US 2014/0059458 A1   Feb. 27, 2014

(51) Int. Cl.
G06F 3/0482 (2013.01)
G06F 3/0484 (2013.01)
G06F 3/0481 (2013.01)
G06F 9/445 (2006.01)
G06T 11/00 (2006.01)

(52) U.S. Cl.
CPC ...... *G06F 3/04842* (2013.01); *G06F 3/04817* (2013.01); *G06F 8/61* (2013.01); *G06T 11/00* (2013.01)

(58) Field of Classification Search
CPC .................................................. G06F 3/0482
See application file for complete search history.

(56) References Cited

U.S. PATENT DOCUMENTS

| 1,215,601 | A | | 2/1917 | Williams |
| 5,835,094 | A | | 11/1998 | Ermel et al. |
| 5,874,966 | A | | 2/1999 | Polimeni et al. |
| 6,037,936 | A | * | 3/2000 | Ellenby ................. G01C 17/34 |
| | | | | 348/211.8 |

(Continued)

FOREIGN PATENT DOCUMENTS

| EP | 2418623 A1 | 2/2012 |
| JP | 2002366594 A | 12/2002 |

(Continued)

OTHER PUBLICATIONS

Peterson, Stephen D. et al., "Visual Clutter Management in Augmented Reality: Effects of Three Label Separation Methods on Spatial Judgments," IEEE Symposium on 3D User Interfaces 2009, Mar. 14-15, 2009, © 2009 IEEE, pp. 111-118.

(Continued)

*Primary Examiner* — Ryan Barrett
(74) *Attorney, Agent, or Firm* — Dorsey & Whitney LLP

(57) ABSTRACT

Augmented reality technology is described. The technology can detect objects in a scene, identifying one or more installed or available applications based on the detected objects, and place icons representing the identified applications proximate to the detected objects in a display of the scene, e.g., so that a user can start or install the identified applications. The technology can also facilitate interaction with an identified object, e.g., to remotely control a recognized object.

33 Claims, 8 Drawing Sheets

(56) References Cited

U.S. PATENT DOCUMENTS

| | | | |
|---|---|---|---|
| 6,252,597 B1 | 6/2001 | Lokuge | |
| 7,071,842 B1* | 7/2006 | Brady, Jr. | G01C 21/20 340/988 |
| 7,313,574 B2 | 12/2007 | Paalasmaa et al. | |
| 7,565,139 B2 | 7/2009 | Neven, Sr. et al. | |
| 7,725,077 B2 | 5/2010 | Jung et al. | |
| 7,870,496 B1* | 1/2011 | Sherwani | H04L 67/38 715/718 |
| 2003/0009469 A1 | 1/2003 | Platt et al. | |
| 2005/0039133 A1* | 2/2005 | Wells | G06Q 10/10 715/740 |
| 2005/0076056 A1 | 4/2005 | Paalasmaa et al. | |
| 2005/0289158 A1 | 12/2005 | Weiss et al. | |
| 2006/0047704 A1 | 3/2006 | Gopalakrishnan | |
| 2006/0277474 A1* | 12/2006 | Robarts | G06Q 10/10 715/745 |
| 2007/0050468 A1 | 3/2007 | Gazit | |
| 2007/0088497 A1 | 4/2007 | Jung | |
| 2007/0100868 A1* | 5/2007 | Hackmann | 707/102 |
| 2008/0275844 A1* | 11/2008 | Buzsaki et al. | 707/3 |
| 2009/0005077 A1* | 1/2009 | Forstall | H04M 1/72544 455/456.2 |
| 2009/0055754 A1 | 2/2009 | Finn et al. | |
| 2009/0102859 A1 | 4/2009 | Athsani et al. | |
| 2009/0167787 A1 | 7/2009 | Bathiche et al. | |
| 2009/0177484 A1 | 7/2009 | Davis et al. | |
| 2009/0239587 A1* | 9/2009 | Negron | G06F 3/04883 455/566 |
| 2009/0262084 A1* | 10/2009 | Yu | G06F 1/14 345/173 |
| 2009/0289956 A1* | 11/2009 | Douris et al. | 345/633 |
| 2009/0322671 A1 | 12/2009 | Scott et al. | |
| 2010/0036968 A1* | 2/2010 | Vance et al. | 709/239 |
| 2010/0120450 A1 | 5/2010 | Herz | |
| 2010/0134318 A1 | 6/2010 | Haughawout et al. | |
| 2010/0169790 A1* | 7/2010 | Vaughan | G06F 3/0481 715/740 |
| 2011/0041095 A1* | 2/2011 | Reed | 715/834 |
| 2011/0113345 A1* | 5/2011 | Choi | H04M 1/66 715/740 |
| 2011/0131510 A1 | 6/2011 | DeLuca et al. | |
| 2011/0138317 A1* | 6/2011 | Kang et al. | 715/780 |
| 2011/0138416 A1* | 6/2011 | Kang et al. | 725/39 |
| 2011/0161875 A1 | 6/2011 | Kankainen | |
| 2011/0167392 A1* | 7/2011 | Dicke | G01C 21/3667 715/864 |
| 2011/0238690 A1* | 9/2011 | Arrasvuori et al. | 707/769 |
| 2011/0246891 A1* | 10/2011 | Schubert | G06F 9/4445 715/719 |
| 2011/0252318 A1* | 10/2011 | Helms | G06F 9/4443 715/702 |
| 2011/0310120 A1 | 12/2011 | Narayanan | |
| 2011/0316845 A1 | 12/2011 | Roberts et al. | |
| 2012/0038671 A1 | 2/2012 | Min et al. | |
| 2012/0072387 A1* | 3/2012 | Yanase | 706/50 |
| 2012/0075341 A1 | 3/2012 | Sandberg | |
| 2012/0075433 A1 | 3/2012 | Tatzgern et al. | |
| 2012/0084662 A1* | 4/2012 | Navarro | H04N 5/44543 715/740 |
| 2012/0098859 A1 | 4/2012 | Lee et al. | |
| 2012/0102050 A1 | 4/2012 | Button et al. | |
| 2012/0105475 A1* | 5/2012 | Tseng | 345/633 |
| 2012/0113138 A1 | 5/2012 | Uusitalo et al. | |
| 2012/0113223 A1 | 5/2012 | Hilliges et al. | |
| 2012/0162254 A1 | 6/2012 | Anderson et al. | |
| 2012/0173979 A1* | 7/2012 | Lee | G06F 9/4445 715/719 |
| 2012/0182205 A1* | 7/2012 | Gamst | 345/7 |
| 2012/0212405 A1 | 8/2012 | Newhouse et al. | |
| 2012/0230538 A1* | 9/2012 | Calman et al. | 382/103 |
| 2012/0274652 A1 | 11/2012 | Sung et al. | |
| 2013/0007668 A1* | 1/2013 | Liu et al. | 715/841 |
| 2013/0011009 A1* | 1/2013 | Chen et al. | 382/103 |
| 2013/0027428 A1 | 1/2013 | Graham et al. | |
| 2013/0051615 A1* | 2/2013 | Lim et al. | 382/103 |
| 2013/0124311 A1* | 5/2013 | Sivanandan | G06Q 30/02 705/14.51 |
| 2013/0155108 A1* | 6/2013 | Williams et al. | 345/633 |
| 2014/0033059 A1* | 1/2014 | Schubert | G06F 9/4445 715/740 |
| 2014/0139465 A1* | 5/2014 | Grosberg | G06F 3/04886 345/173 |
| 2014/0204119 A1 | 7/2014 | Malamud et al. | |
| 2014/0223323 A1* | 8/2014 | Kasahara | 715/740 |
| 2014/0282162 A1* | 9/2014 | Fein et al. | 715/769 |

FOREIGN PATENT DOCUMENTS

| | | |
|---|---|---|
| JP | 2012-090077 A | 5/2012 |
| WO | 2012/033768 A2 | 3/2012 |

OTHER PUBLICATIONS

Reardon, M , "Augmented reality comes to mobile phones", accessed at https://web.archive.org/web/20120223124538/http://news.cnet.com/8301-30686_3-20017965-266.html, posted on Sep. 29, 2010, 5 pages.

"7 Amazing Augmented Reality Apps for Android," Jul. 28, 2010, last accessd Mar. 24, 2011, 12 pages.

"Find nearby restaurants with Yelp iPhone app: now including augmented reality," Sep. 16, 2009, 4 pages.

"User-Defined Icons," flexhex, © 2007 Inv Softworks LLC, last accessed Mar. 24, 2011.

An overview of the Layar platform, http://site.layar.com/create/platform-overview , obtained Mar. 7, 2013 at Internet Archive WayBackMachine snapshot of Jan. 29, 2011, web page copyright 2010 Layar.

AR—it's reality, only better , http://www.ericsson.com/article/augmented_reality_736383515_c, last accessed Mar. 7, 2013.

Augmented Reality, AR Tools and Applications, http://www.augmentedreality.org , Mar. 24, 2011.

Augmented Reality, Qualcomm Developer Newtwork, http://developer.qualcomm.com/ar , obtained Mar. 7, 2013 at Internet Archive WayBackMachine snapshot of Dec. 23, 2010.

De-las-Heras-Quiros, Pedro et al., "Mobile Augmented Reality browsers should allow labeling objects a Position Paper for the Augmented Reality on the Web W3C Workshop," May 30, 2010, 5 pages.

Gronbaek, Kaj, "Towards Geo-Spatial Hypermedia: Concepts and Prototype Implementation," Hypertext 02, 13th ACM Conference on Hypertext and Hypermedia, ACM New York 2002, 10 pages.

Henry, Tyson R. and Scott E. Hudson, "Multidimensional Icons," The Interaction Technique Notebook, © 1990 ACM , ACM Transactions on Graphics, vol. 9, No. 1, Jan. 1990, pp. 133-137.

International Search Report and Written Opinion for PCT Application No. PCT/US12/52320 filed Aug. 24, 2012, mailing date: Dec. 31, 2012, 10 pages.

Julier, Simon et al, "Information Filtering for Mobile Augmented Reality," Proc. ISAR'00, Munich, Germany, Oct. 5-6, 2000, pp. 3-11, © 2000 IEEE.

MacGregor, Robert et al., "MetaDesk: A Semantic Web Desktop Manager," *Proc. Knowledge Markup and Semantic Annotation Workshop (SEMANNOT04)*, CEUR-WS, 2004, pp. 107-110.

Mobile Behavior: an Omnicom Group Company, Jun. 15, 2009, © 2009 MobileBehavior LLC, last accessed Mar. 24, 2011.

Naisbitt, Jeffrey et al., "Active Interaction: Live Remote Interaction through Video Feeds," University of Illinois, 2006.

The MAC App Store, http://www.apple.com/mac/app-store/ , obtained Mar. 7, 2013 at Internet Archive WayBackMachine snapshot of Jan. 31, 2011.

Yelp Monocle Hidden Feature Unlocks iPhone Augmented Reality—YouTube, uploaded on Aug. 27, 2009 by gearlive , http://www.youtube.com/watch?v=jHEcg6FyYUo , last accessed Mar. 7, 2013.

Itoh, F. et al., "Two-way Navigation System for the Information Space and the Real Space with Internet Cameras", pp. 61-68 (Mar. 23, 1999).

(56) References Cited

OTHER PUBLICATIONS

Ohmura, J. et al., "Location Based Clustering in P2P Multimedia Streaming", IEICE, vol. 110, Issue 373, pp. 37-42 (Jan. 13, 2011),.

* cited by examiner

VIRTUAL REALITY APPLICATIONS

CROSS-REFERENCE TO RELATED APPLICATION

This application is a U.S. National Stage application under 35 U.S.C. §371 of International Application No. PCT/US2012/052320, filed on Aug. 24, 2012, entitled "VIRTUAL REALITY APPLICATIONS," which is incorporated herein by reference in its entirety.

BACKGROUND

The number of mobile computing devices in use has increased dramatically over the last decade and continues to increase. Examples of mobile computing devices are mobile telephones, digital cameras, and global positioning system ("GPS") receivers. According to one study, 60% of the world's population has access to mobile telephones. An increasing number of people use digital cameras and some manufacturers of digital cameras presently have revenues of tens of billions of United States dollars annually. Digital cameras are used to capture, store, and share images. Often, the images can be viewed nearly immediately after they are captured, such as on a display device associated with the digital cameras. Once an image is captured, it can be processed by computing devices. Image recognition is one such process that can be used to recognize and identify objects in an image. For example, image recognition techniques can determine whether an image contains a human face, a particular object or shape, etc.

Augmented reality is a view of a physical, real-world environment that is enhanced by computing devices to digitally augment visual or auditory information a user observes in the real world. As an example, an augmented reality system can receive scene information from a digital camera and a GPS, identify objects (e.g., people, animals, structures, etc.) in the scene, and provide additional information relating to the identified objects. A user of such a system can take a photo of a scene using a mobile computing device (e.g., a digital camera, a cellular phone, a "smartphone," etc.) and automatically receive information about one or more objects an augmented reality system recognizes in the photographed (i.e., digitized) scene.

There are now hundreds of thousands of applications available for mobile devices. Users can download and install applications ("apps") that are interesting or useful to them. However, finding such applications can be challenging.

DETAILED DESCRIPTION

Figure 1:
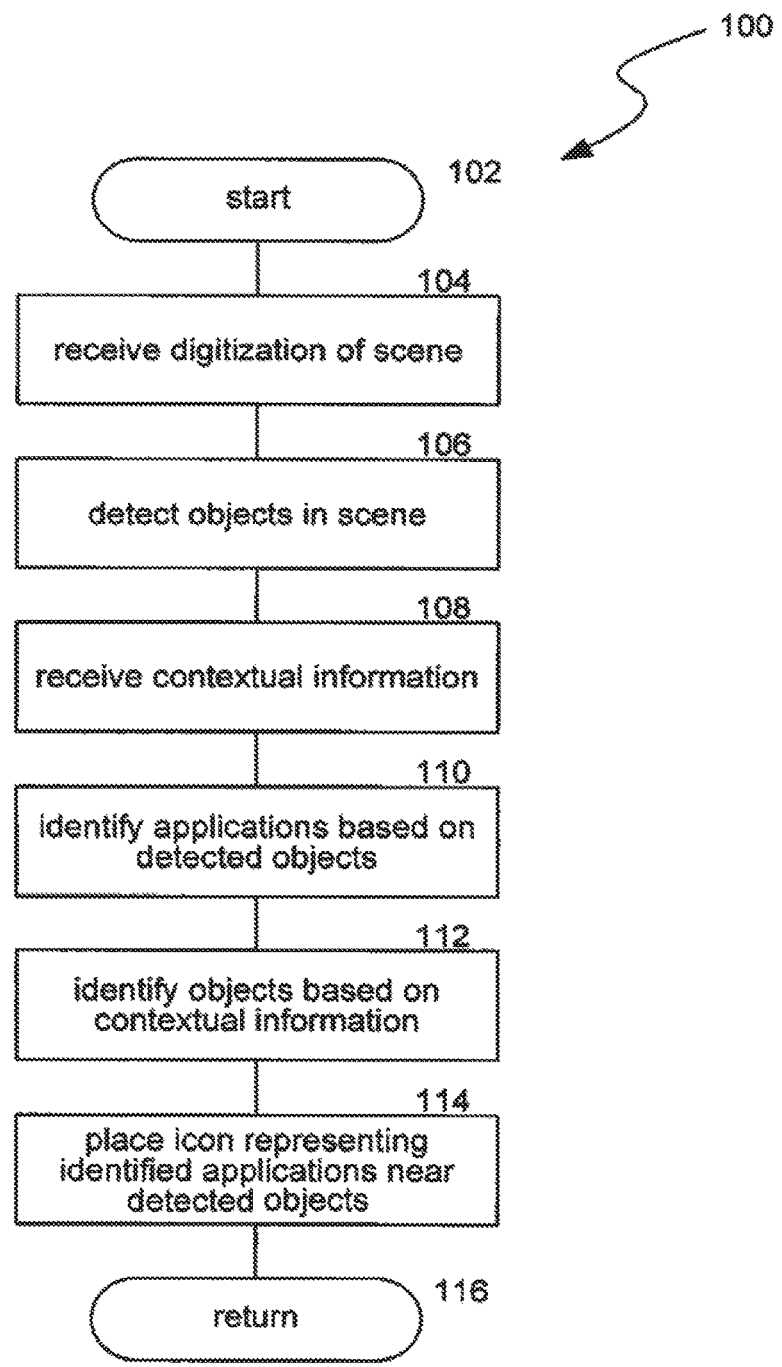
FIG. 1 is a flow diagram illustrating a routine invoked by the disclosed technology in various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Augmented reality technology ("the technology") is described. In various embodiments, the technology detects objects in a scene, identifies one or more installed applications based on at least one detected object, and displays an icon representing the identified one or more applications, e.g., proximate to the detected object(s) in a display of the scene. The technology can use various techniques for object recognition, e.g., image recognition, pattern recognition, etc. When a user selects a displayed icon, an application corresponding to the selected icon can start. In various embodiments, the technology can instead (or additionally) identify available but not-yet-installed applications based on at least one detected object. When the user selects a displayed icon, an application corresponding to the selected icon can be installed and optionally started. Thus, the technology enables a user to quickly identify applications that may be pertinent to the context or milieu in which users find themselves.

The technology can employ a digital camera configured for use with a mobile device the user is employing to digitize a scene. The mobile device can also process contextual information, e.g., GPS coordinates. Some applications may correspond to contextual information. As an example, when the scene includes a particular restaurant, an identified application can be an application corresponding to the restaurant. If multiple applications correspond to an object (e.g., a restaurant, store, or other establishment or object), the technology may identify applications suitable for the current location (e.g., GPS coordinates). Alternatively, a user can specify the contextual information to use. As an example, the technology may identify applications for establishments that are open at the current time, but the user may be interested only in applications corresponding to establishments that are open for dinner later in the day.

The technology can identify applications, e.g., by matching attributes corresponding to installed (or available) applications to the present context or milieu, e.g., based on attributes of matched objects. The attributes can be stored locally on a mobile device or at a server. A user can also associate or disassociate an application with recognized objects, e.g., so that a particular application's icon is visible or removed the next time an object is in a digitized scene.

In various embodiments, the technology can also identify applications based on stored application "preferences." These preferences may be indicated by application developers, organizations, etc. As an example, when a user is in a particular geographic area, a "sponsored application" may be identified by the technology.

When multiple application icons are identified, the technology may use various techniques to alter the user interface. As examples, the icons may be stacked; some icons may appear before other applications in the stack; some icons (e.g., sponsored applications) may be larger than other icons; etc.

The technology can also adapt the icons for applications, e.g., so that the icons are representative of underlying information. As an example, a restaurant review application's icon may be identified for many restaurants, and the icon may change to indicate a review for the recognized restaurant.

In various embodiments, the technology can detect objects in a scene, associate the detected objects with methods for interacting with the detected objects, obtain a specification for interacting with the detected objects using the associated methods; and provide a user interface for controlling the detected objects. As an example, when an audiovisual device (e.g., television, DVD player, etc.) is detected in a scene, the technology can communicate with the detected device (e.g., using WiFi, radiofrequency, infrared, or other communications means) and obtain a specification for interacting with the device. The specification can provide information, e.g., available commands, how the commands are to be sent, the format for the commands, etc. The specification can also provide information about user interface elements. Upon receiving the specification, the technology can provide a user interface that a user can use to control the device. When the user interacts via the user interface, the technology can transmit commands to the device. In various embodiments, the technology can communicate with the detected objects by employing a radiofrequency identification tag, wireless network, infrared signal, etc.

In various embodiments, the technology includes a component configured for use with a device that receives a signal from a computing device, provides an identification of one or more methods operable to control the device, receives a command from the computing device wherein the command was identified in the one or more methods, and controls the device according to the received command. The command can be to control media (e.g., play, stop, pause, rewind, fast forward, etc.), control a power circuit (e.g., turn on/off), etc. The component may also provide a specification for the one or more methods, e.g., a hint for providing a user interface component.

Turning now to the figures, FIG. 1 is a flow diagram illustrating a routine 100 invoked by the disclosed technology in various embodiments. The routine 100 begins at block 102. The routine 100 then continues at block 104, where it receives a digitized vision of a scene. The routine 100 then continues at block 106, where it detects objects in the scene. In various embodiments, the routine 100 may employ various image recognition techniques to recognize objects. The routine 100 then continues at block 108 where it receives contextual information. Examples of contextual information are location information (GPS coordinates, street address, city, etc.), time of day, etc. The routine 100 then continues at block 110 where it identifies applications based on the detected objects. As an example, when the technology recognizes a television, the technology may indicate an application that provides current television listings. As another example, when the technology recognizes a restaurant, the technology may identify an application that is associated with the restaurant, e.g., to provide menus, reserve seats, etc. The routine 100 then continues at block 112 where it identifies objects based on contextual information. As an example, if there are two restaurants identified in the scene and one of the restaurants is only open for lunch and dinner, the technology may only identify the restaurant open for breakfast if the present time is within what would normally be considered breakfast hours. The routine 100 then continues at block 114, where it places an icon representing identified applications near detected objects. The routine 100 then returns at block 116.

Those skilled in the art will appreciate that the logic illustrated in FIG. 1 and described above, and in each of the flow diagrams discussed below, may be altered in a variety of ways. For example, the order of the logic may be rearranged, substeps may be performed in parallel, illustrated logic may be omitted, other logic may be included, etc.

Figure 2:
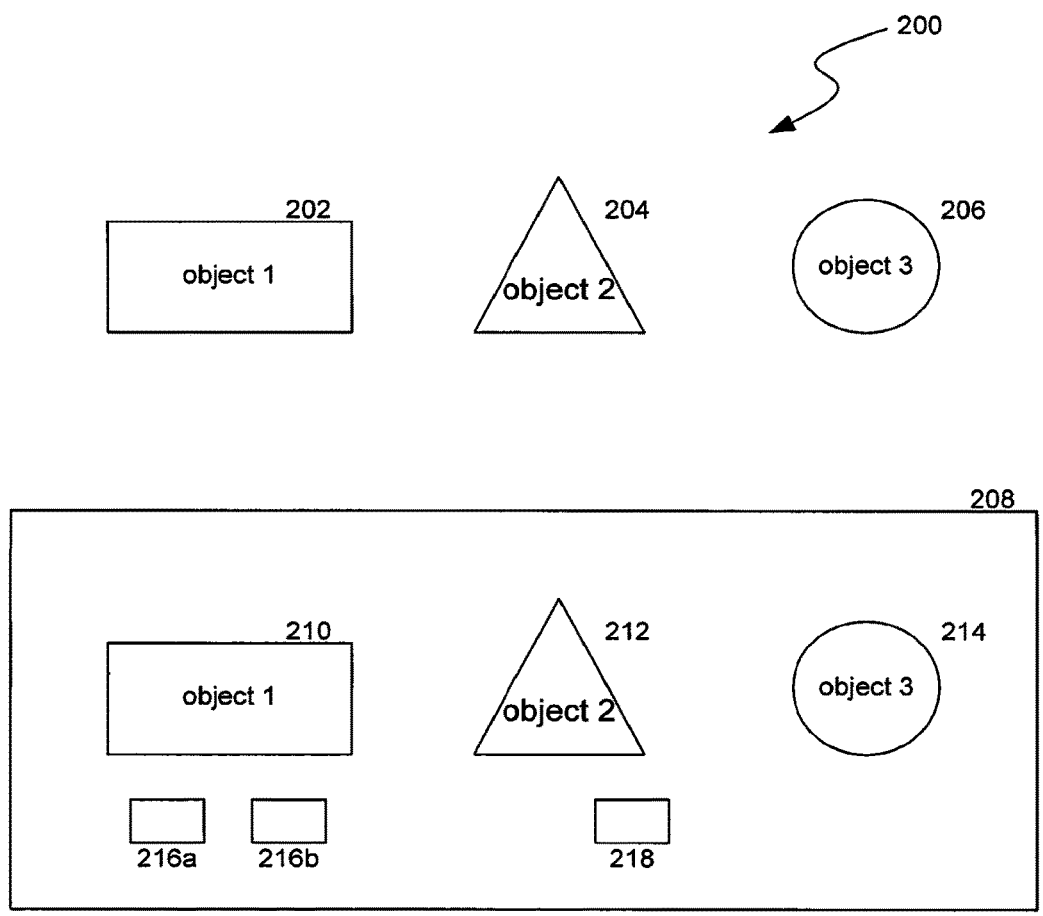
FIG. 2 is an environmental diagram illustrating use of the disclosed technology in various embodiments.

FIG. 2 is an environmental diagram illustrating use of the disclosed technology in various embodiments. A scene 200 includes three objects: a first object 202, a second object 204, and a third object 206. A display of a mobile computing device 208 displays digitized representations of the objects as a digitized representation of the first object 210, a digitized representation of the second object 212, and a digitized representation of the third object 214. The digitized representation of the first object to 10 is associated with a first icon 216A and a second icon 216B. The digitized representation of the second object 212 is associated with a third icon 218. As described above, the icons can represent installed applications or available applications. When a user selects an icon, e.g., by touching an area near the icon on a touchscreen of the mobile computing device, the technology may launch the indicated application (if already installed) or install the indicated application. In some embodiments, the technology may automatically launch applications that are installed.

Figure 3:
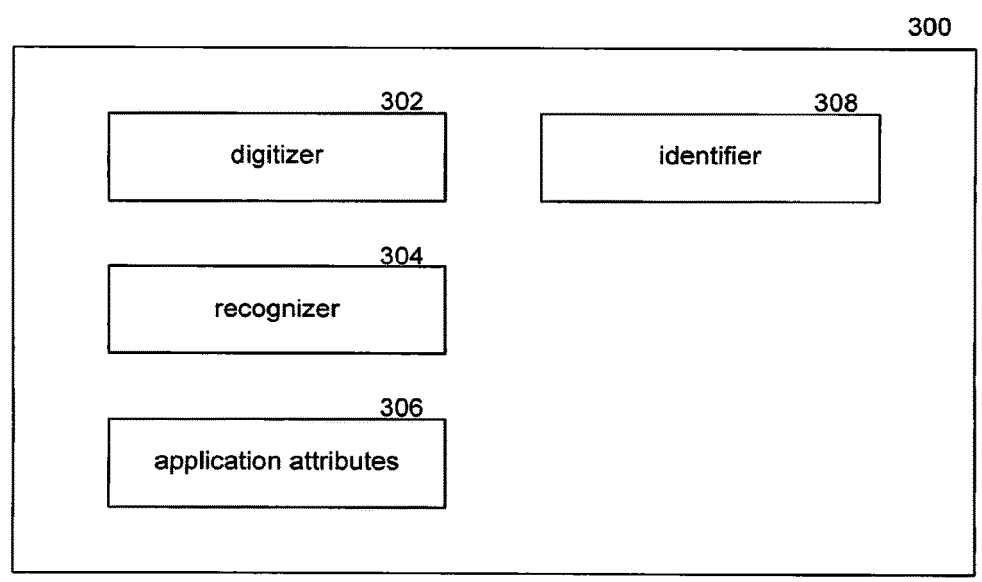
FIG. 3 is a block diagram illustrating components employed by the disclosed technology in various embodiments.

FIG. 3 is a block diagram illustrating components employed by the disclosed technology in various embodiments. The components 300 can include a digitizer 302, a recognizer 304, application attributes 306, and an identifier 308. In various embodiments, additional components (not illustrated) or a subset of the illustrated components 300 can be employed without deviating from the scope of the claimed technology. The digitizer component 302 can digitize a scene, e.g., a scene received via an image capture device (not illustrated). The recognizer component 304 can recognize objects in a digitized scene. In various embodiments, the recognizer component can use various image recognition techniques to recognize objects in the digitized scene. The identifier component 308 can identify installed applications to be associated with recognized objects, e.g., using stored application attributes 306. The attributes can indicate, e.g., information about objects with which applications are associated, time of day, location, etc. The identifier component 308 can also employ a server computing device (not illustrated), e.g., to identify applications that are not presently installed but may be associated with recognized objects.

Figure 4:
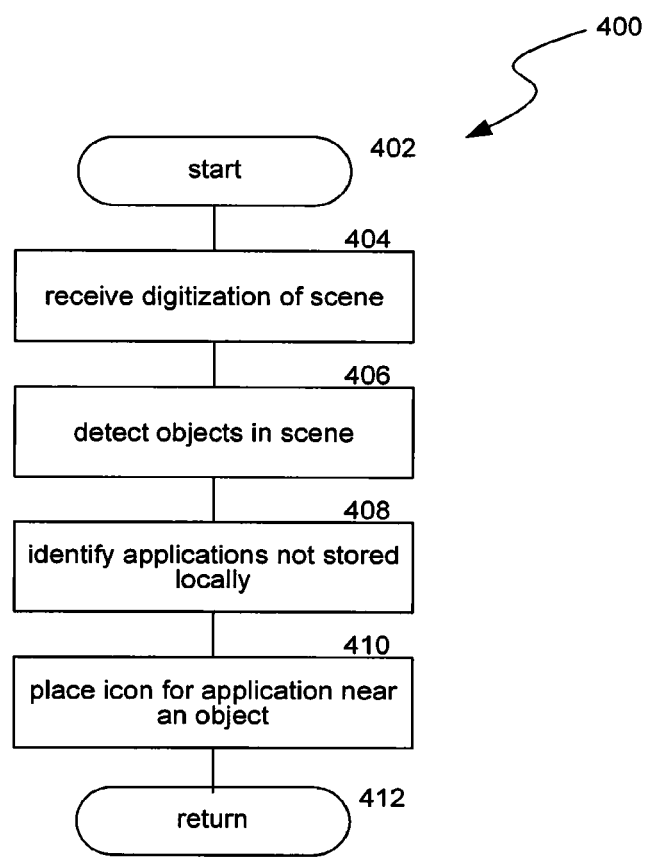
FIG. 4 is a flow diagram illustrating a routine invoked by the disclosed technology in various embodiments.

FIG. 4 is a flow diagram illustrating a routine 400 invoked by the disclosed technology in various embodiments. The routine 400 begins at block 402. The routine 400 continues at block 404, where it receives a digitized vision of a scene. The routine 400 then continues at block 406 where it detects objects in the digitized scene. The routine 400 can employ various image recognition techniques to recognize objects. The routine 400 then continues at block 408 where it identifies applications that are not stored locally, e.g., on a mobile computing device on which the routine executes. The routine 400 then continues at block 410 where it places an icon for an application near a recognized object. As an example, if the routine 400 recognizes a coffee shop in a digitized scene and the user's mobile computing device does not have installed an application corresponding to the recognized coffee shop, the routine 400 may place an icon for an application corresponding to the recognized coffee shop that, if selected, causes the application to be installed. The routine 400 then returns at block 412.

Figure 5:
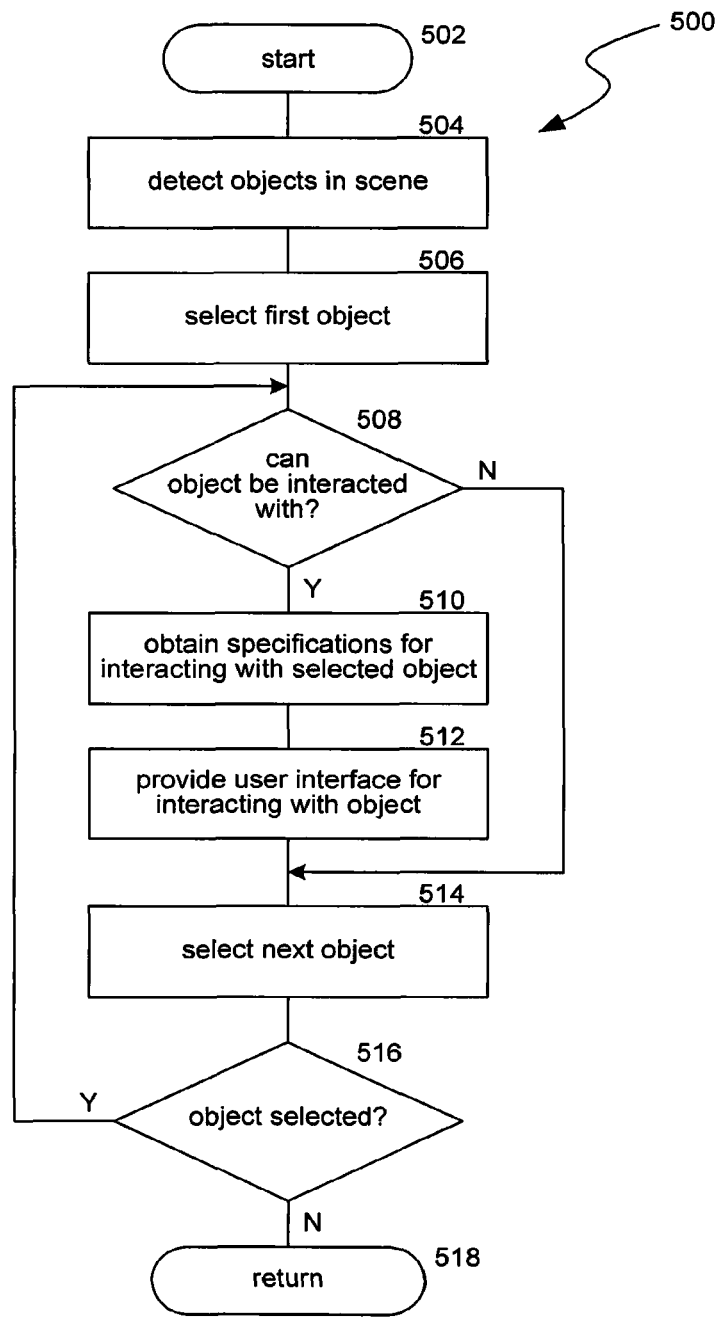
FIG. 5 is a flow diagram illustrating a routine invoked by the disclosed technology in various embodiments.

FIG. 5 is a flow diagram illustrating a routine 500 invoked by the disclosed technology in various embodiments. The routine 500 begins at block 502. The routine then continues at block 504, where it detects objects in a scene. The routine 500 then continues at block 506, where it selects a first object from the recognized objects. The routine 500 then continues at decision block 508, where it determines whether the selected object can be interacted with. The routine 500 may make this determination, e.g., by querying a database (e.g., a local database stored at the computing device invoking the routine 500 or a remote database stored at a server computing device). If the selected object can be interacted with, the routine 500 continues at block 510. Otherwise, the routine 500 continues at block 514. At block 510, the routine 500 obtains specifications for interacting with the selected object. In various embodiments, the routine 500 may obtain the specifications from a locally stored database, the object directly (e.g., wirelessly), or from a remote computing device. The routine 500 may then provide a user interface to a user so that the user can interact with the selected object. As an example, if the recognized object is a television or other audiovisual device, the routine 500 may provide a user interface that enables the user to control the audiovisual device. The received specifications can include instructions for providing aspects of the user interface. The routine 500 then continues at block 514, where it selects a next object from the set of objects detected above in relation to block 504. The routine 500 then continues at decision block 516, where it determines whether a next object was selected. If there are no more objects to be selected, the routine 500 returns at block 518. Otherwise, the routine 500 continues at decision block 508 to analyze the selected object.

Figure 6A:
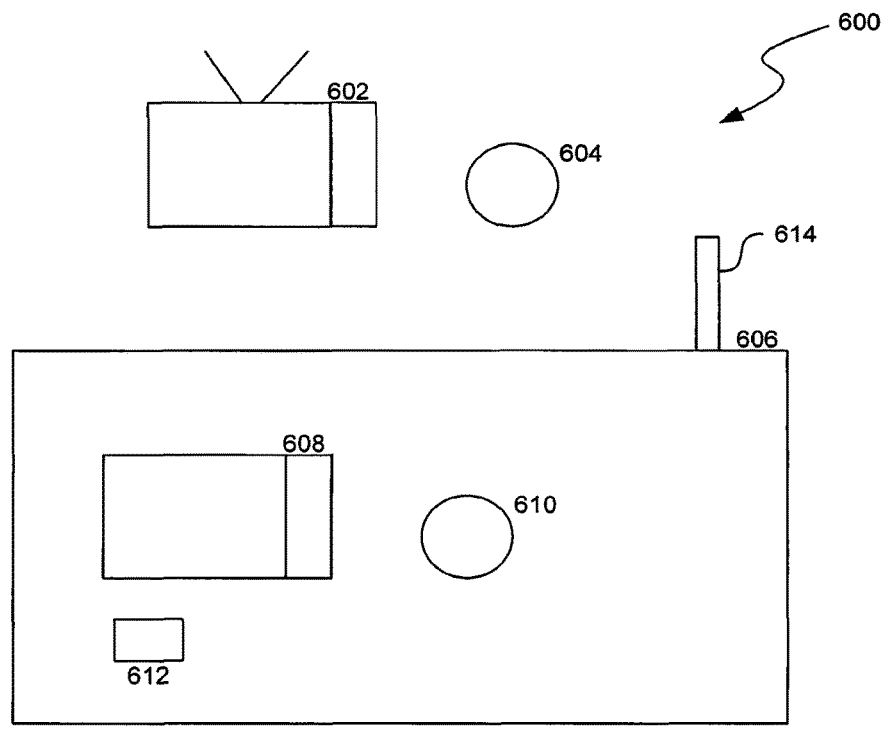
FIGS. 6A and 6B are environmental diagrams illustrating use of the disclosed technology in various embodiments.
Figure 6B:
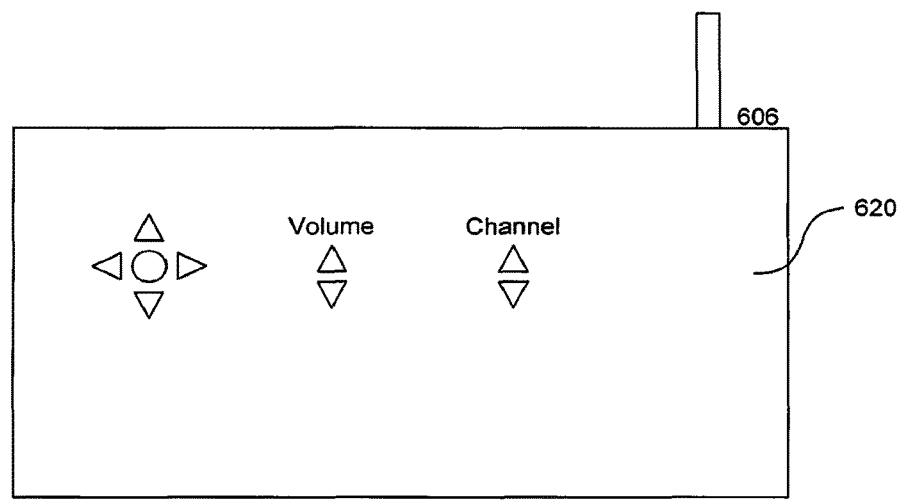

FIGS. 6A and 6B are environmental diagrams illustrating use of the disclosed technology in various embodiments. FIG. 6A includes a scene 600 and a digitized version of the scene 600 displayed at a mobile computing device 606. The scene 600 includes a television 602 and another object 604. The digitized version of the scene 600 displayed at the mobile computing device 606 includes a digitized representation of the television 608 and a digitized representation of the other object 610. The mobile computing device 606 also displays an icon 612 associated with the digitized representation of the television 608. As an example, the technology may have recognized the television 602 and identified an application corresponding to the television 602 and represented by the icon 612. When the user selects the icon 612, the technology may launch the corresponding application (or install the corresponding application). In various embodiments, the technology may employ an antenna 614 associated with the mobile computing device 606, e.g., to communicate with the television 602 or a network computing device (not illustrated) to receive specifications relating to controlling the television 602. In various embodiments, the mobile computing device 606 may communicate with the television using infrared, radio frequency, WiFi, etc. FIG. 6B illustrates a user interface 620 displayed by the mobile computing device 606, e.g., when the user launches the application by selecting icon 612.

Figure 7:
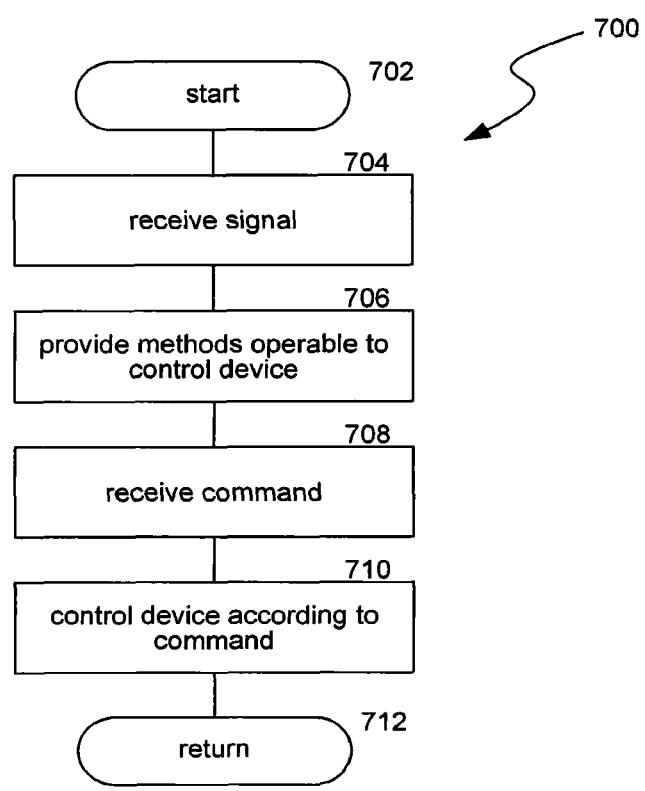
FIG. 7 is a flow diagram illustrating a routine invoked by the disclosed technology in various embodiments.

FIG. 7 is a flow diagram illustrating a routine 700 invoked by the disclosed technology in various embodiments. The routine 700 begins at block 702. The routine 700 then continues at block 704, where it receives a signal. In various embodiments, the routine 700 can receive a signal from a mobile computing device that a user is operating to command a device on which the routine 700 executes. The routine 700 then continues at block 706, work provides methods operable to control the device. As an example, the routine 700 may provide a specification for controlling the device. The specification can include indications of user interfaces, available commands, frequencies, etc. The routine 700 then continues at block 708, where it receives a command. In various embodiments, the routine may receive commands from the mobile computing device to which the routine 700 provided the specification. The routine 700 then continues at block 710, where it controls the device according to the received command. The routine then returns at block 712.

Figure 8:
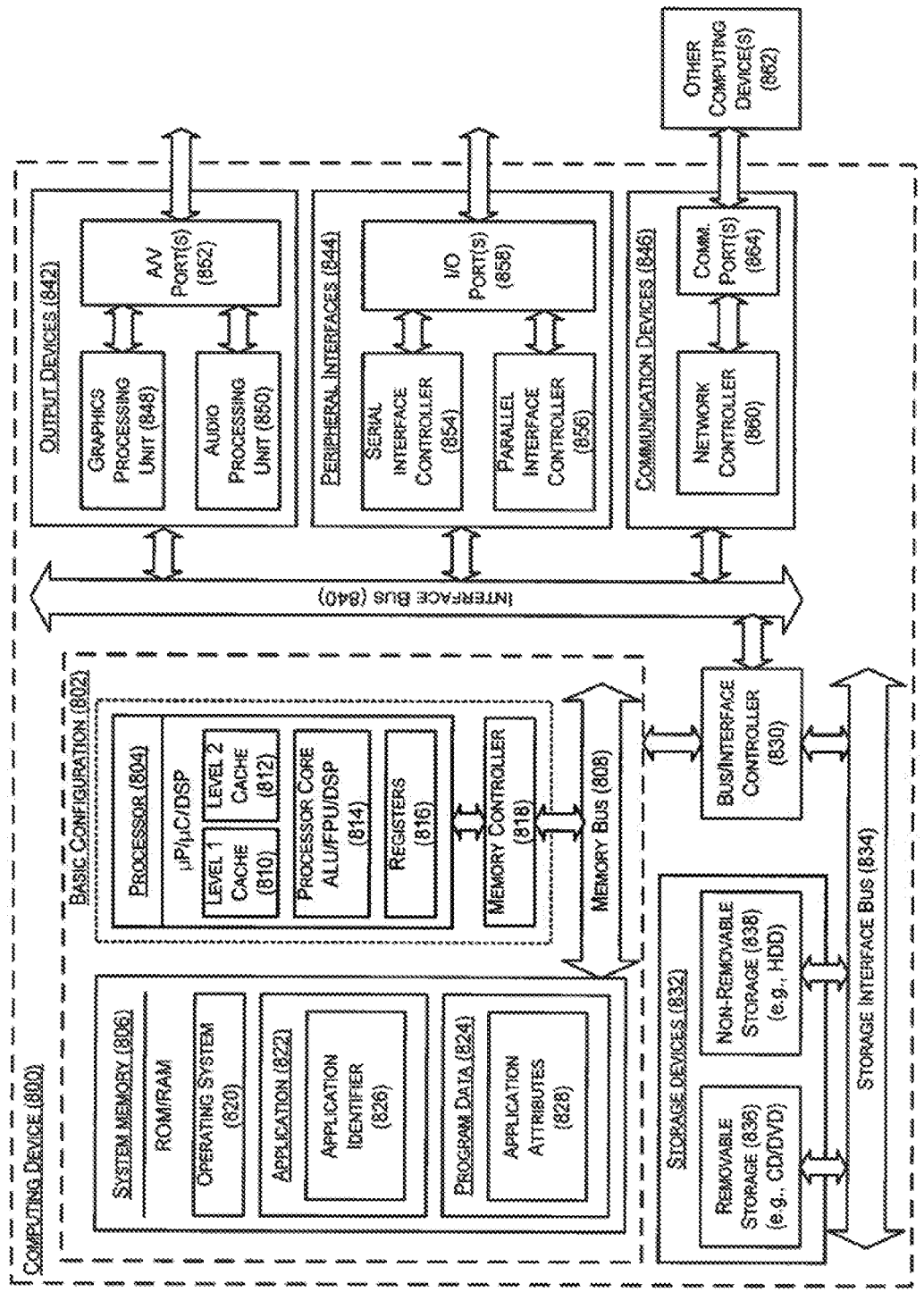
FIG. 8 is a block diagram of an illustrative embodiment of a computing device that is arranged in accordance with at least some embodiments of the present disclosure.

FIG. 8 is a block diagram illustrating an example computing device 800 that is arranged in accordance with at least some embodiments of the present disclosure. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor ("μP"), a microcontroller ("μC"), a digital signal processor ("DSP"), or any combination thereof. Processor 804 may include one or more levels of caching, such as a level one cache 810 and a level two cache 812, a processor core 814, and registers 816. An example processor core 814 may include an arithmetic logic unit ("ALU"), a floating point unit ("FPU"), a digital signal processing core ("DSP Core"), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include an application identifier component 826 that is arranged to identify applications corresponding to a recognized object. Program data 824 may include application attribute information 828, as is described herein. In some embodiments, application 822 may be arranged to operate with program data 824 on operating system 820 such that applications can be identified. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives ("HDD"), optical disk drives such as compact disk ("CD") drives or digital versatile disk ("DVD") drives, solid state drives ("SSD"), and tape drives to name a few. Example computer storage media may include volatile and non-volatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency ("RF"), microwave, infrared ("IR") and other wireless media. The term computer readable media as used herein may include both storage media and communication media.

Computing device 800 may be implemented as a portion of a small-form factor portable (or mobile) electronic device such as a cell phone, a personal data assistant ("PDA"), a personal media player device, a wireless web-watch device, a personal headset device, an application specific device, or a hybrid device that include any of the above functions. Computing device 800 may also be implemented as a personal computer including both laptop computer and non-laptop computer configurations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system having a processor, the method comprising:
digitizing a vision of a scene received from an image capture device to provide a digitized scene;
detecting multiple objects in the digitized scene, wherein detecting the multiple objects comprises recognizing digitized objects in the digitized scene;
receiving contextual information associated with a user, wherein the contextual information comprises first contextual information and second contextual information;
identifying installed applications based on the detected objects, wherein the identifying includes identifying the installed applications based on one of the first contextual information or the second contextual information, further wherein the identifying includes searching a list of attributes for an attribute associated with one or more of the detected objects, the list of attributes provided by the user and associated with at least one of the installed applications;
identifying an object from the detected objects based on another one of the first contextual information or the second contextual information to provide the identified object;
placing an icon that represents at least one of the identified installed applications proximate to the identified object in a display of the digitized scene, wherein the at least one of the identified installed applications is selected based on the identified object;
receiving a user selection of the icon;
responsive to the reception of the user selection of the icon, selecting the identified object;
determining that the identified object can be interacted with, wherein the determination comprises querying a database about the identified object;
obtaining at least one specification regarding an interaction with the identified object, wherein the at least one specification includes information regarding commands to interact with the identified object and information regarding user interface elements; and
providing a user interface to interact with the identified object based on the at least one specification in accordance with the user interface elements.

2. The method of claim 1, wherein the digitized scene is displayed on an output device.

3. The method of claim 1, wherein at least one of the first contextual information or the second contextual information is received via an input from the user.

4. The method of claim 1, wherein at least one of the first contextual information or the second contextual information is based on detected positional information.

5. The method of claim 1, wherein detecting the multiple objects includes employing one or more image recognition methods.

6. The method of claim 1, further comprising causing an installed application that corresponds to the icon to launch.

7. The method of claim 1, wherein the list of attributes is received via a keyboard input.

8. The method of claim 1, further comprising: receiving an input to associate an installed application not identified with an object detected in the digitized scene, and associating the installed application with the detected object;

receiving an input to disassociate an application identified in correspondence with an object detected in the digitized scene, and disassociating this application from the detected object; or a combination thereof.

9. The method of claim 1, wherein at least one of the first contextual information or the second contextual information comprises time of day information, and wherein identifying the object from the multiple objects is based on the time of day information.

10. The method of claim 1, wherein at least one of the first contextual information or the second contextual information includes time of day information, and wherein the time of day information is received via an input from the user.

11. The method of claim 1, further comprising:
identifying applications not stored locally on the computing system based on the detected objects, wherein identifying the applications includes identifying applications not stored locally based on one of the first contextual information or the second contextual information, wherein identifying the applications includes searching a list of attributes for an attribute associated with one or more of the detected objects, and wherein the list of attributes provided by the user and associated with at least one of the applications is not stored locally; and
placing an icon that, when selected by the user, installs a corresponding application on the computing device, wherein the icon is placed proximate to the identified object in a display of the digitized scene.

12. The method of claim 1, wherein providing the user interface to interact with selected object based on the at least one specification comprises:
providing, from the at least one specification, instructions to provide aspects of the user interface; and
providing the aspects of the user interface to control the selected object.

13. The method of claim 1, wherein providing the user interface to interact with selected object based on the at least one specification comprises:
providing, from the specification, instructions regarding the user interface; and
providing the user interface to control the selected object.

14. A computer-readable storage device having stored thereon instructions that, if executed by a computing device, cause the computing device to perform operations comprising:
digitize a vision of a scene to provide a digitized scene;
detect multiple objects in the digitized scene, wherein the detection of the multiple objects comprises recognition of digitized objects in the digitized scene;
receive contextual information associated with a user, wherein the contextual information comprises first contextual information and second contextual information;
identify installed applications based on the detected objects, wherein the identification includes identification of the installed applications based on one of the first contextual information or the second contextual information, further wherein the identification includes searching a list of attributes for an attribute associated with one or more of the detected objects, the list of attributes provided by the user and associated with at least one of the installed applications;
identify an object from the detected objects based on another one of the first contextual information or the second contextual information;
place an icon, that when selected by the user, launches at least one of the identified installed applications proximate to the identified object in a display of the digitized scene, wherein the at least one of the identified installed applications is selected based on the identified object;
receive a user selection of the icon;
responsive to the reception of the user selection of the icon, select the object;
determine that the object can be interacted with, wherein the determination comprises querying a database about the object,
obtain a specification regarding an interaction with the object, wherein the specification includes commands to interact with the object and user interface elements; and
provide a user interface to interact with the object based on the specification in accordance with the user interface elements.

15. The computer-readable storage device of claim 14, wherein the digitized scene is displayed on an output device.

16. The computer-readable storage device of claim 14, wherein at least one of the first contextual information or the second contextual information is received via an input from the user.

17. The computer-readable storage device of claim 14, wherein at least one of the first contextual information or the second contextual information is based on detected positional information.

18. The computer-readable storage device of claim 14, wherein the detection of the multiple objects includes employment of one or more image recognition methods.

19. The computer-readable storage device of claim 14, wherein the list of attributes is received via a keyboard input.

20. The computer-readable storage device of claim 14, wherein the operations further comprise: receive an input to associate an installed application not identified with an object detected in the digitized scene, and associate the installed application with the detected object; receive an input to disassociate an application identified in correspondence with an object detected in the digitized scene, and disassociate this application from the detected object; or a combination thereof.

21. The computer-readable storage device of claim 14, wherein at least one of the first contextual information or the second contextual information comprises time of day information, and wherein the identification of the object from the multiple objects is based on the time of day information.

22. The computer-readable storage device of claim 14, wherein at least one of the first contextual information or the second contextual information includes time of day information, and wherein the time of day information is received via an input from the user.

23. The computer-readable storage device of claim 14, wherein the operations further comprise:
identify applications not installed based on the detected objects, wherein the identification of the applications includes identification of applications not installed based on one of the first contextual information or the second contextual information; and
place an icon that, when selected by the user, installs a corresponding application, the icon placed proximate to the identified object in a display of the digitized scene.

24. A system, comprising:
a processor; and
a memory comprising instructions that, in response to execution by the processor, cause the system to perform operations comprising:
detect multiple objects in a digitized scene, wherein the detection of the multiple objects comprises recognition of digitized objects in the digitized scene;

receive contextual information associated with a user, wherein the contextual information comprises first contextual information and second contextual information;

identify installed applications based on the detected objects and on one of the first contextual information or the second contextual information, wherein the identification of the installed applications includes search a list of attributes for an attribute associated with one or more of the detected objects, the list of attributes provided by the user and associated with at least one of the installed applications;

identify an object from the detected objects based on another one of the first contextual information or the second contextual information;

place an icon, that when selected by the user launches at least one of the identified installed applications proximate to the identified object in a display of the digitized scene, wherein the at least one of the identified installed applications is selected based on the identified object;

receive a user selection of the icon, wherein the user selection launches at least one of the identified installed applications;

responsive to the reception of the user selection of the icon, select the identified object;

determine that the identified object can be interacted with, wherein the determination comprises a query of a database about the object;

obtain at least one specification regarding an interaction with the identified object, wherein the at least one specification includes information regarding commands to interact with the identified object and information regarding user interface elements; and provide a user interface to interact with the object based on the at least one specification.

25. The system of claim 24, wherein the system further comprises a digital camera, and wherein the memory further comprises instructions to receive the digitized vision of the digitized scene.

26. The system of claim 24, wherein the digitized scene is displayed on an output device.

27. The system of claim 24, wherein at least one of the first contextual information or the second contextual information is received via an input from the user.

28. The system of claim 24, wherein at least one of the first contextual information or the second contextual information is based on detected positional information.

29. The system of claim 24, wherein the instructions to detect include instructions to use one or more image recognition methods.

30. The system of claim 24, wherein the list of attributes is received via a keyboard input.

31. The system of claim 24, further comprising instructions to: receive an input to associate an installed application not identified with an object detected in the digitized scene, and associate the installed application with the detected object; receive an input to disassociate an application identified in correspondence with an object detected in the digitized scene, and disassociate this application from the detected object; or a combination thereof.

32. The system of claim 24, wherein at least one of the first contextual information or the second contextual information comprises time of day information, and wherein the identification of the object from the multiple objects is based on the time of day information.

33. The system of claim 24, wherein at least one of the first contextual information or the second contextual information includes time of day information and wherein the time of day information is received via an input from the user.

* * * * *

UNITED STATES PATENT AND TRADEMARK OFFICE
CERTIFICATE OF CORRECTION

| | | |
|---|---|---|
| PATENT NO. | : 9,690,457 B2 | Page 1 of 1 |
| APPLICATION NO. | : 13/821560 | |
| DATED | : June 27, 2017 | |
| INVENTOR(S) | : Levien et al. | |

It is certified that error appears in the above-identified patent and that said Letters Patent is hereby corrected as shown below:

In the Claims

In Column 11, Line 16, in Claim 24, delete "user launches" and insert -- user, launches --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*